Jan. 29, 1952  H. SHUFF  2,583,971
APPARATUS FOR HARVESTING TREES
Filed Sept. 22, 1950  12 Sheets-Sheet 1
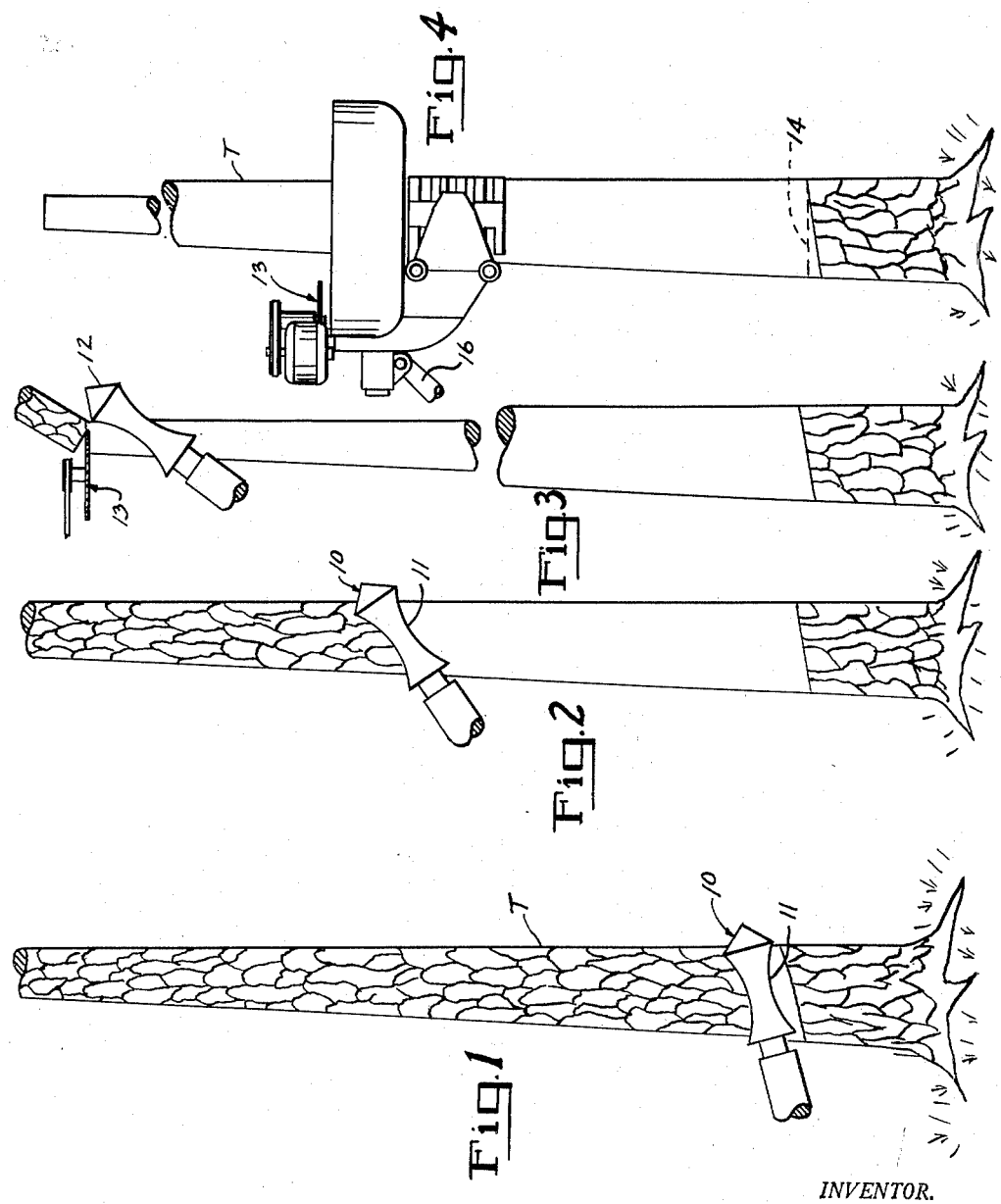
INVENTOR.
HUGH SHUFF
BY
Jennings & Carter
ATTORNEYS

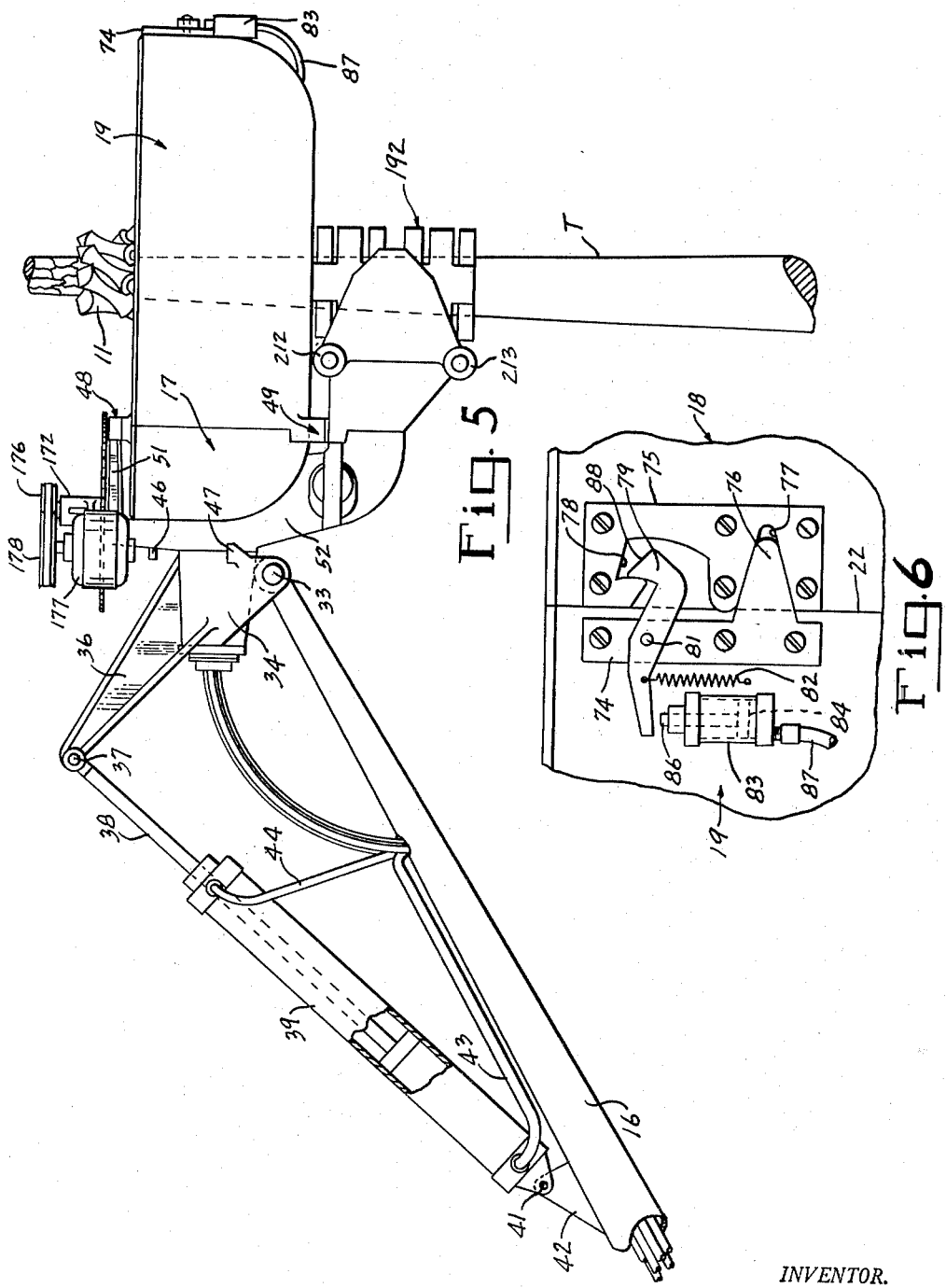

Jan. 29, 1952  H. SHUFF  2,583,971
APPARATUS FOR HARVESTING TREES
Filed Sept. 22, 1950  12 Sheets-Sheet 3

INVENTOR.
HUGH SHUFF
BY Jennings & Carter
ATTORNEYS

INVENTOR.
HUGH SHUFF

BY
Jennings & Carter
ATTORNEYS

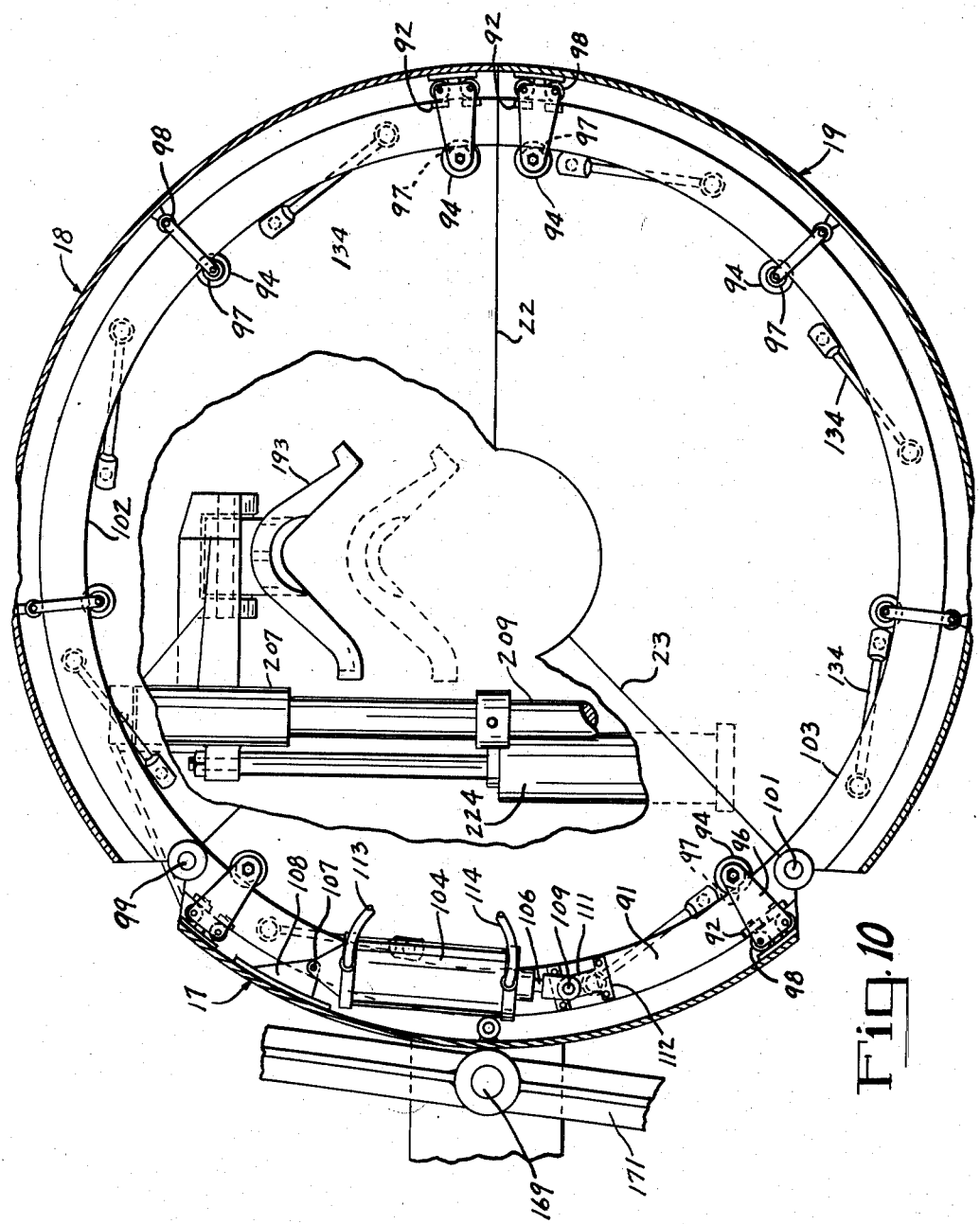

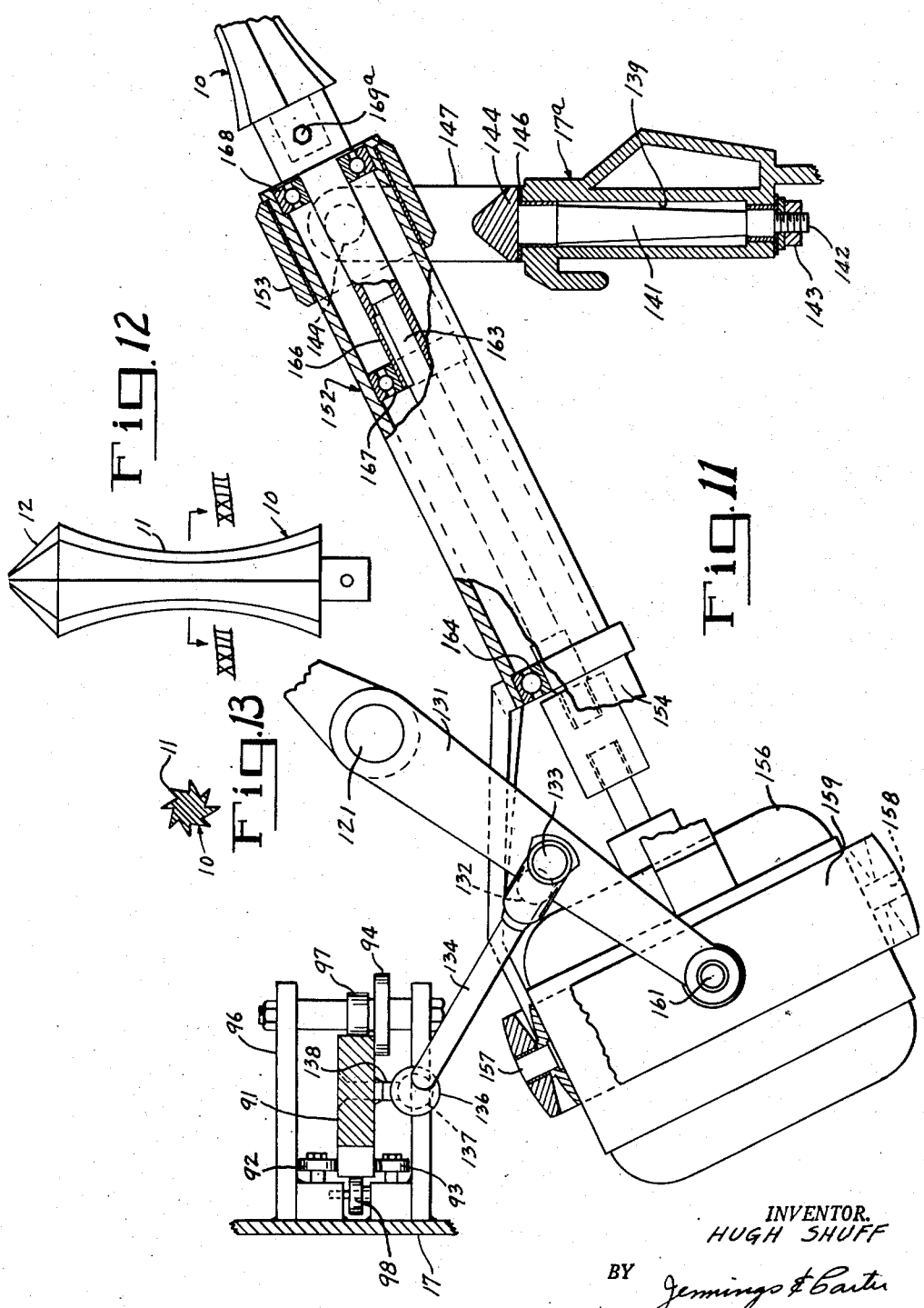

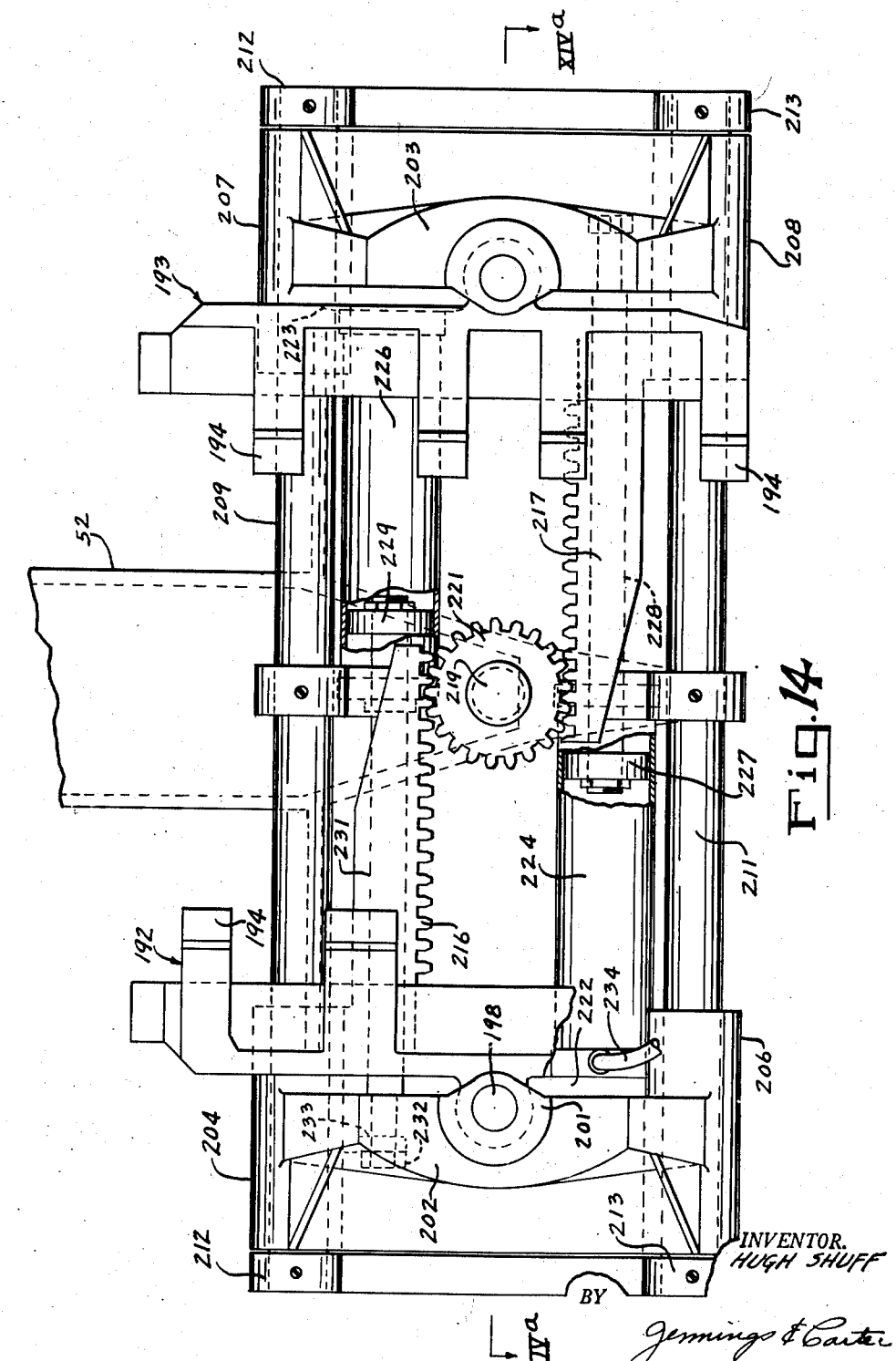

Jan. 29, 1952  H. SHUFF  2,583,971
APPARATUS FOR HARVESTING TREES
Filed Sept. 22, 1950  12 Sheets-Sheet 9
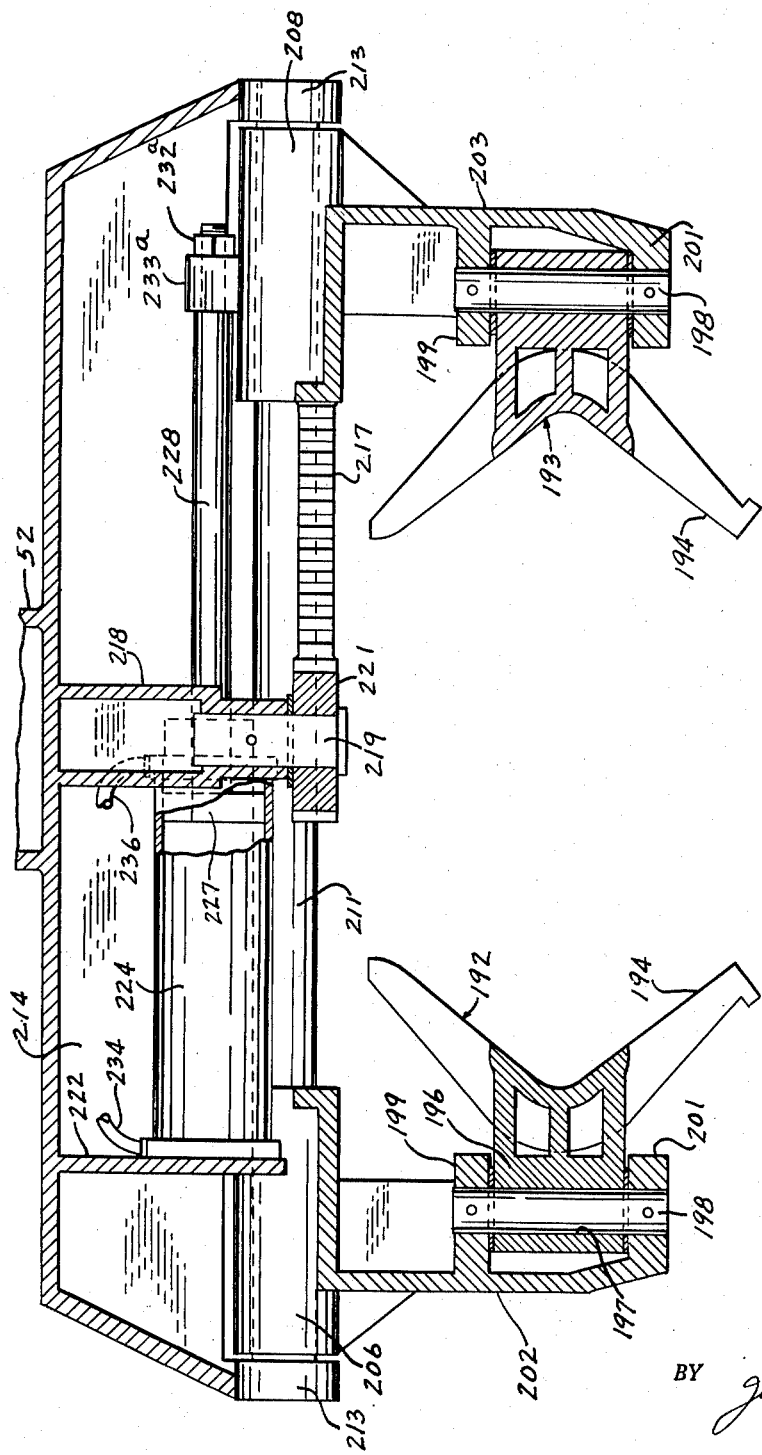
Fig. 14ᵃ
INVENTOR.
HUGH SHUFF
BY
*Jennings & Carter*
ATTORNEYS

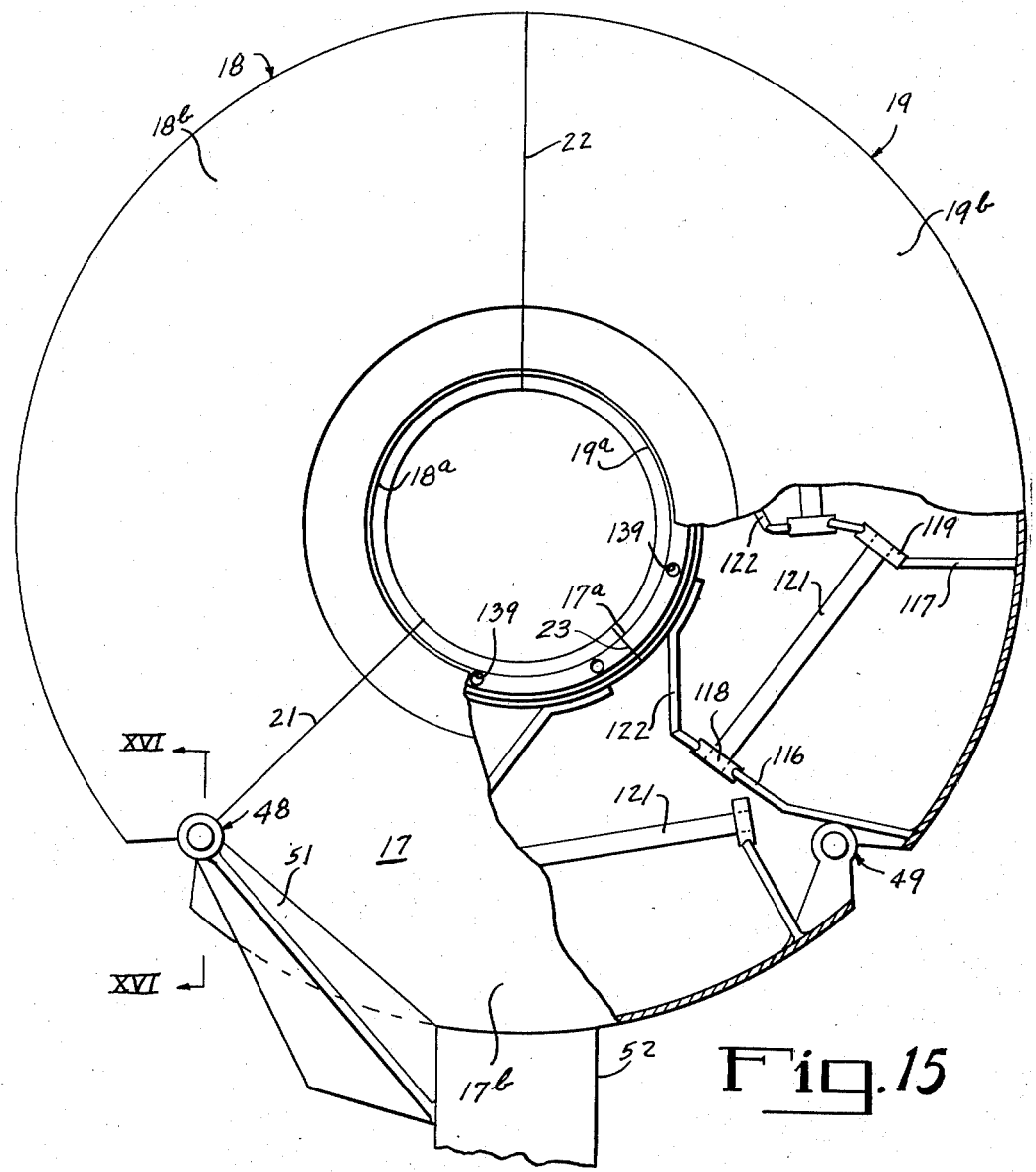

Jan. 29, 1952      H. SHUFF      2,583,971
APPARATUS FOR HARVESTING TREES
Filed Sept. 22, 1950      12 Sheets-Sheet 11
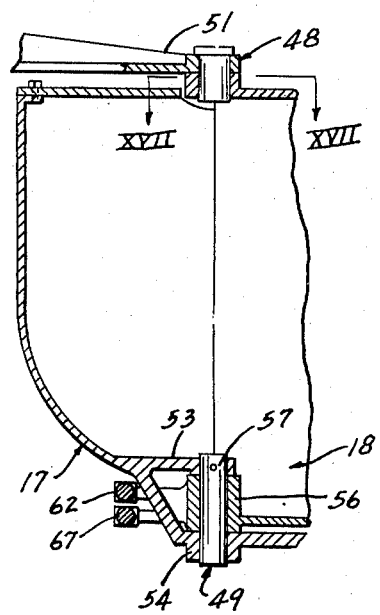
Fig. 16
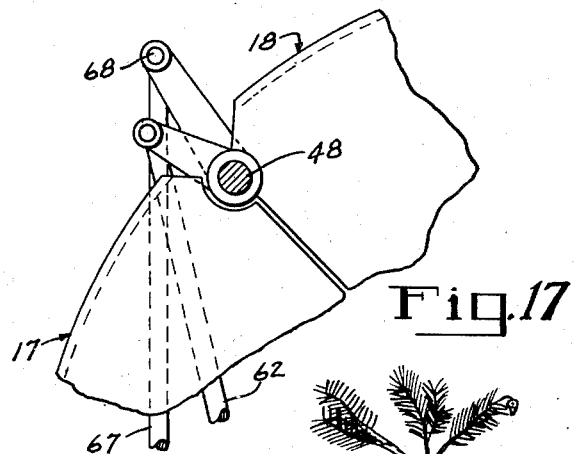
Fig. 17
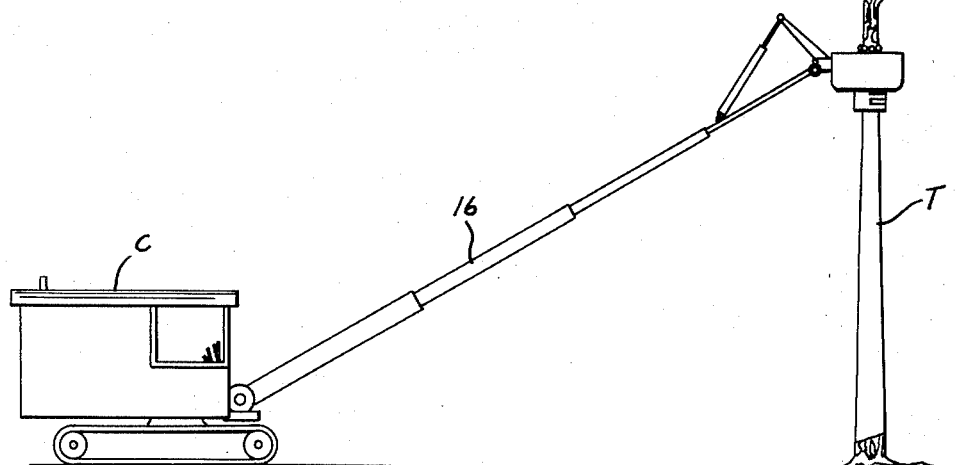
Fig. 4ᵃ
INVENTOR.
HUGH SHUFF
BY
Jennings & Carter
ATTORNEYS

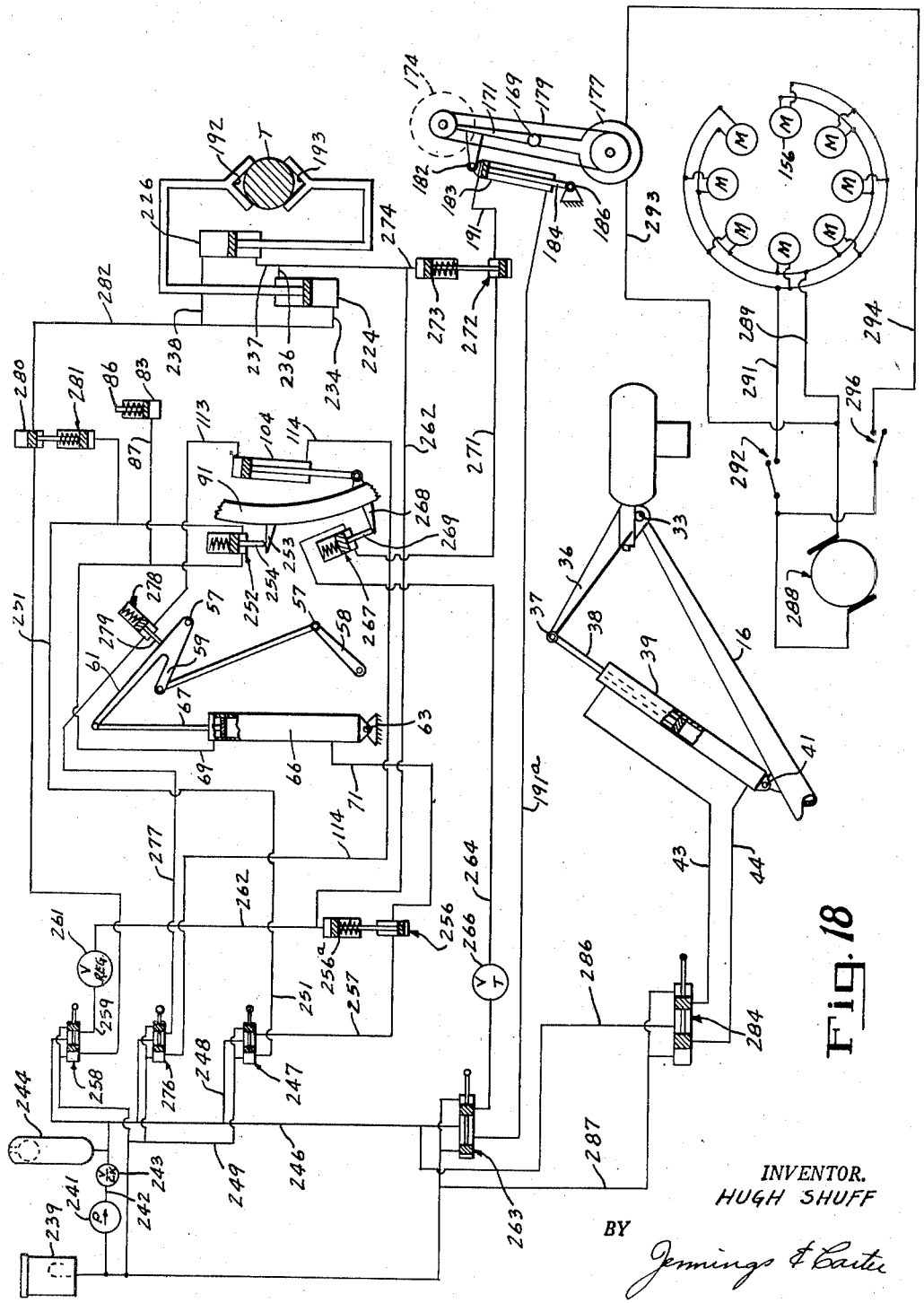

Patented Jan. 29, 1952

2,583,971

UNITED STATES PATENT OFFICE 2,583,971

APPARATUS FOR HARVESTING TREES

Hugh Shuff, Oneonta, Ala.

Application September 22, 1950, Serial No. 186,151

7 Claims. (Cl. 144—208)

My present invention relates to apparatus for harvesting trees and has for an object the provision of apparatus of the character designated by which standing trees may be barked, the limbs thereof trimmed off and the tree then felled.

In the cutting of trees for lumber purposes it is conservatively estimated that approximately 40% of the trunks of timber trees hauled from the forest to the saw mill is wasted. This wastage is principally in the form of the slabs resulting from squaring up the log in the process of cutting it into lumber. It is also well known in the art that such slabs are entirely suitable for the manufacture of by-products such as paper provided the bark is removed therefrom. Attempts have been made to remove bark after the slabs are cut, then to supply such barked slabs in proper lengths to paper mills. Insofar as I am aware, such attempts have not been successful due principally to the difficulties of physically handling the slabs after they are cut from the log. Consequently, large quantities of valuable wood are wasted because there exists no commercially feasible way to remove the bark.

In attempting to overcome the difficulties presented by the above problem I have conceived that the most expeditious way to obtain bark free slabs is to bark the tree before it is felled. In barking the tree I also remove the limbs, knots and the like projecting from the body of the trunk. Having removed the bark and limbs I then top the tree and fell it, delivering to the saw mill a skinned, clean log. Further, the usable length of the log is increased inasmuch as I can bark the tree further toward the top than actually will be sawed into lumber with the idea that the clean, barked, small diameter end itself can be sold for pulp wood.

An object is to provide apparatus for accomplishing the foregoing embodying a plurality of rotary cutters mounted in a supporting structure in such manner that the cutters may be placed in cutting position around a standing tree, and also embodying improved means causing the cutters to accommodate themselves to the changing diameter of the tree from the stump toward the top.

Another object is to provide apparatus of the character designated in which the cutters are effective to remove limbs and the like projecting from the tree trunks as the apparatus is moved up the standing tree during the process of removing the bark.

Further objects are to provide apparatus embodying the foregoing features which also is provided with a tree topping saw forming an integral part of the apparatus, which saw may be operated at the will of the operator to top the tree; to provide tree clamping mechanism whereby after the tree has been barked and topped the same may be supported while workmen cut the tree at the base, permitting the tree to be loaded on a vehicle or the like by the same crane used to support my improved apparatus; and in general to provide barking and topping apparatus for standing trees which shall be rugged, simple of construction and operation and fully effective for its intended purposes.

A form of apparatus which embodies the constructional features of my invention is illustrated in the accompanying drawings forming a part of this application in which:

Figs. 1 to 3, inclusive, are wholly diagrammatic views illustrating the principles of my invention;

Fig. 4 is a somewhat diagrammatic detailed view illustrating my improved apparatus clamped to a barked topped tree holding the same ready for the tree to be severed adjacent its stump end;

Fig. 4a is a vew illustrating the crane supporting the apparatus about a tree during the barking operation;

Fig. 5 is a side elevational view illustrating the apparatus in operation on a tree and showing the method of supporting the same from the upper end of the crane boom;

Fig. 6 is a detail elevational view illustrating the automatic locking mechanism for holding the pivoted housing in locked position about a tree together with the unlatching mechanism therefor;

Fig. 10 is a detail sectional view taken generally along line X—X of Fig. 9 but having a number of parts omitted for the sake of clarity;

Fig. 11 is a fragmental detached view, partly in section, showing one of the motor driven cutter assemblies and supporting mechanism therefor;

Fig. 12 is an elevational view of one of the cutters;

Fig. 13 is a detail sectional view taken generally along line XIII—XIII of Fig. 12;

Fig. 14 is a fragmental elevational view taken along line XIV—XIV of Fig. 9 with certain parts broken away the better to illustrate the clamping mechanism for securing the apparatus to a tree after the same is barked and topped;

Fig. 14a is a detail sectional view taken generally along line XIVa—XIVa of Fig. 14;

Fig. 15 is a plan view of the frame of the apparatus with substantially all of the mechanism removed, partly broken away;

Fig. 16 is a detail sectional view taken along line XVI—XVI of Fig. 15;

Fig. 17 is a detail sectional view taken along line XVII—XVII of Fig. 16; and,

Fig. 18 is a wholly diagrammatic view to illustrate the hydraulic and electrical control circuits for the apparatus.

Figure 7:
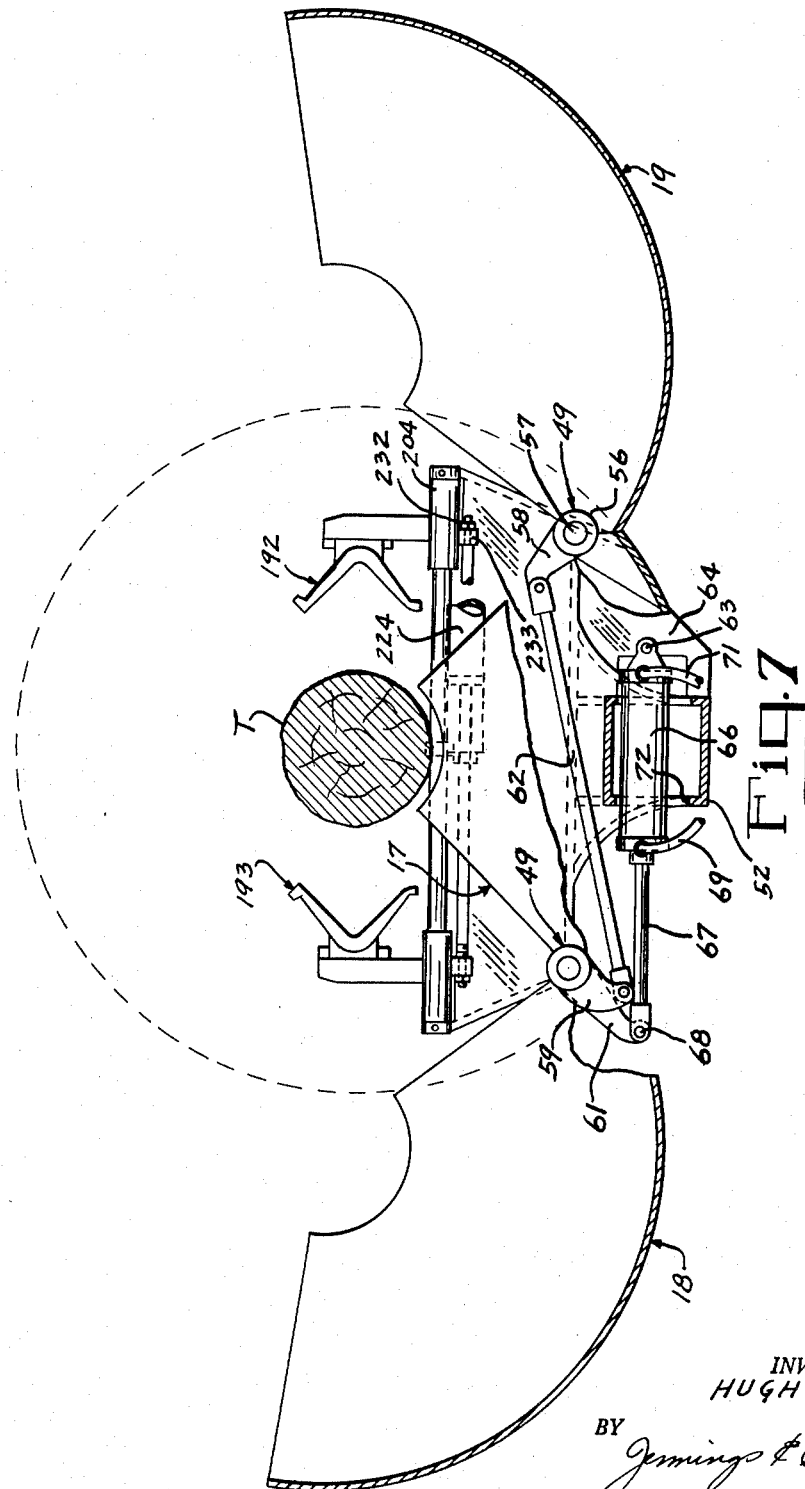
Fig. 7 is a somewhat diagrammatic sectional plan view illustrating the apparatus in open position about a tree.

Referring now to the drawings for a better understanding of my invention and more particular to Figs. 1 to 4 and 4a inclusive, it will be seen that in its broad and general aspects my invention comprises a plurality of cutters 10 suitably mounted for rotation as will presently appear, and having concave cutting surfaces 11 disposed to engage the tree T to be barked, limbed and topped. Further, the cutters 10 embody conical shaped ends 12 which also are serrated to provide cutting surfaces.

By reference to Fig. 1 it will be seen that if a plurality of the cutters 10 is to engage completely about a tree the concave surfaces 11 thereof must engage the tree adjacent its lower large diameter end at a relatively small angle to the horizontal. However, and as is shown in Figs. 2 and 3, as the cutters move up the tree to a reduced diameter section thereof, the longitudinal axis of the cutter must increase in angularity relative to the horizontal. Thus, it is necessary in carrying out my invention to provide means for varying the angle between the longitudinal axes of the cutters and the horizontal.

After the tree is skinned and limbed I provide topping mechanism in the form of a saw structure 13 which may be brought into operation at the will of the operator to cut the top from the tree as shown in Fig. 3.

After the tree is topped the entire apparatus is moved downwardly so that it is approximately at the center of gravity of the tree, the clamping means heretofore mentioned is brought into play, and the tree is cut along the line 14 adjacent its base by any suitable means such as by workmen with cross-cut or power saws. Since the entire apparatus is supported on the boom 16 of a crane C as shown in Fig. 4a, the usable part of the trunk may be loaded onto a vehicle for hauling to the saw mill without felling the tree to the ground.

Referring now more particularly to Figs. 5, 7, 8, 9, 10 and 15 it will be seen that my improved apparatus comprises generally a main housing, circular in shape. The housing is divided into three arcuate sections 17, 18 and 19. The section 17 is what I shall refer to hereinafter as the central or supporting section of the housing inasmuch as it is the portion of the apparatus to which the crane boom attaches. The section 18 and 19 are pivoted as will be expained later to the opposite edges of the central section 17, and there is provided mechanism for parting the same along the lines 21, 22 and 23 shown in the drawings. The sections are provided covers 17b, 18b, and 19b, respectively.

The central or supporting section 17 of the housing carries an outstanding boss 24 within which is secured a spindle 26. It is from the boss 24 that the entire device is pivotally supported so that its longitudinal axis may be moved in a vertical plane up and down a tree.

The outwardly elongated boss 24 is threaded as at 27 to receive a nut 28 which holds the spindle 26 in place therein. Surrounding the boss 24 are bearings 29 and 31 with their inner races pressed onto the boss. On the end of the boom 16 of the crane C, and pivoted thereto as at 33, is a housing 34 within which the outer races of the bearings 29 are fitted. Formed integrally with the housing 34 is an upwardly extending brace plate 36. Pivotally connected to the upper end of the plate 36 by a pin 37 is the piston rod 38 of a double acting fluid pressure cylinder 39. The cylinder 39 is pivoted at 41 to a bracket 42 carried on the boom 16. Fluid pressure lines 43 and 44 are connected to opposite ends of the cylinder 39. The central section 17 is provided with stops 46 which are disposed to engage stops 47 carried by the housing 34, thereby to limit rotational movement of the entire device about the axis of the boss 24 to approximately 90° on either side of the vertical. As will appear as the description proceeds, the center of gravity of the apparatus as a whole is below the axial line of the spindle 26 and boss 24 so that the same normally hangs by gravity in the position illustrated in Figs. 5 and 9 of the drawing. As best shown in Figs. 16, and 17 the housing sections 18 and 19 are pivoted at their respective sides or ends to the central section 17 on two vertically aligned points 48 and 49. The two upper pivot points 48 comprise pins carried in the outer ends of arms 51. The arms 51 are formed integrally with an upstanding reinforced part 52 of the housing section 17. The lower sets of pivot points, each of which is vertically aligned beneath its associated upper pivot point, are formed by forwardly projecting arms 53 and a lower bearing boss 54, both of which are formed integrally with the section 17. The sections 18 and 19 each carry a boss 56 fitting between their respective arms 53 and 54, and the pivotal connection is completed by the provision of a pin 57 passing therethrough.

Formed integrally with the boss 56 of the section 19 is an arm 58. Formed integrally with the boss 56 on the section 18 are a pair of arms 59 and 61. A tie rod 62 is pivotally connected at each end to the arms 58 and 59, tying the sections 18 and 19 together for simultaneous, equiangular pivotal movement.

Pivotally mounted as at 63 to a plate 64 carried by the central section 17 is a double acting fluid pressure cylinder 66 carrying a piston rod 67. The piston rod 67 is pivotally connected at 68 to the outer end of the arm 61. Fluid pressure lines 69 and 71 are provided for the admission of fluid to either end of the cylinder 66. The upstanding portion 52 of the housing section 17 is provided with slots 72 which permit the piston 66 to pivot about its pivot point 63 upon opening and closing movement of the sections 18 and 19.

Figure 9:
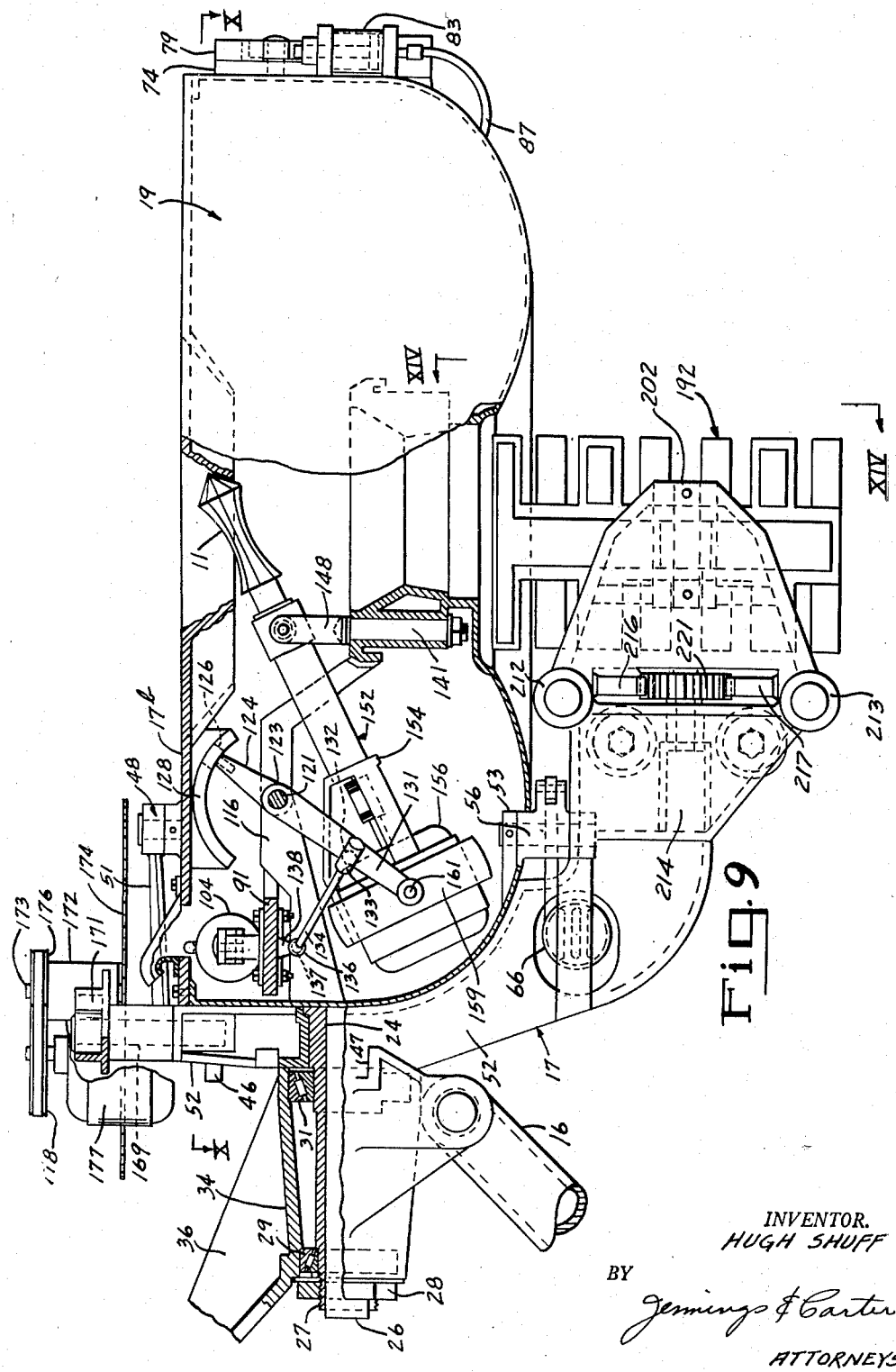
Fig. 9 is a side elevational view, partly broken away and in section and drawn to an enlarged scale.

The sections 18 and 19 are locked together along the part line 22 therebetween by means of the mechanism now to be described and which is shown more particularly in Figs. 6 and 9 of the drawing. Secured to the vertical wall of the section 19 is a plate 74 having a lip portion 76 projecting past the part line 22, to overlie the section 18. Secured to the section 18 is a keeper member 75 having a slot 77 therein for receiving the wedge shaped projection 76.

The keeper 75 is cut out as at 78 to provide a detent for receiving a locking member 79 pivotally mounted as at 81 to the plate 74. The locking member is biased into engagement with the keeper by means of a spring 82. The member 79 is moved to unlatching position by means of a small fluid pressure cylinder 83 having a piston 84 and piston rod 86 therein. The piston rod is disposed beneath the projecting end of the member 79, whereupon when fluid is admitted through a line 87 to the lower end of the cylinder the piston rod moves upwardly, withdrawing the locking member 79 from the keeper. It will be noted that the locking end proper of the member 79 is sloped as at 88 whereby when the sections 18 and 19 are brought together the lever is automatically depressed and engages behind the keeper. Further, the wedge shaped projection 76 cooperates with the slot 77 to center the sections 18 and 19 vertically, assuring that they match properly when closed.

The cutters and means for supporting, driving and changing the angularity from the horizontal as well as for moving them toward and from the tree will now be described. Mounted within the segmental central housing section 17 for rotary movement relative thereto is a segmental control ring 91, see particularly Figs. 9, 10 and 11. The ring 91 is supported adjacent its outer periphery on vertically disposed upper sets of rollers 92 and lower sets 93 therefore. The rollers are mounted for rotation on suitable pins projecting from the inner wall of the housing section 17. The inner periphery of the ring 91 is supported on the flat surface of horizontal rollers 94 mounted for rotation in brackets 96 carried by the inner wall of the housing section 17. The ring is held against lateral shifting by means of inner horizontally disposed rollers 97 and pairs of outer horizontally disposed rollers 98. The ring 91 is thus rigidly confined to rotation relative to the housing section 17 about the center from which the wall portion thereof is struck.

Pivotally connected as at 99 and 101 to the ends of the arcuate ring section 91 are arcuate sections 102 and 103 of cutter control rings associated with the housing sections 18 and 19, respectively. These arcuate ring sections are supported in very much the same way as these previously described on rollers 94, 92 and 93, and held against lateral shifting by the rollers 97 and 98. It will thus be seen that when the device is closed as is illustrated in Fig. 10 the arcuate ring sections 91 and 102 and 103 form a complete circle. As will appear, means is provided for centering the pivot points 99 and 101 directly in alignment with the pivot points 48 and 49 between the housing section when it is desired to open the apparatus for placing it about a tree.

The means for shifting the cutter control ring mechanism comprises a fluid pressure cylinder 104 having a piston rod 106. The cylinder is pivotally supported as at 107 from a bracket 108 projecting inwardly from the vertical wall of the section 17. The piston rod 106 is pivotally connected as at 109 to a lug 111 carried by a bracket 112 fixed to the ring section 91. Fluid under pressure may be admitted selectively to opposite ends of the cylinder 104 through lines 113 and 114.

Figure 8:
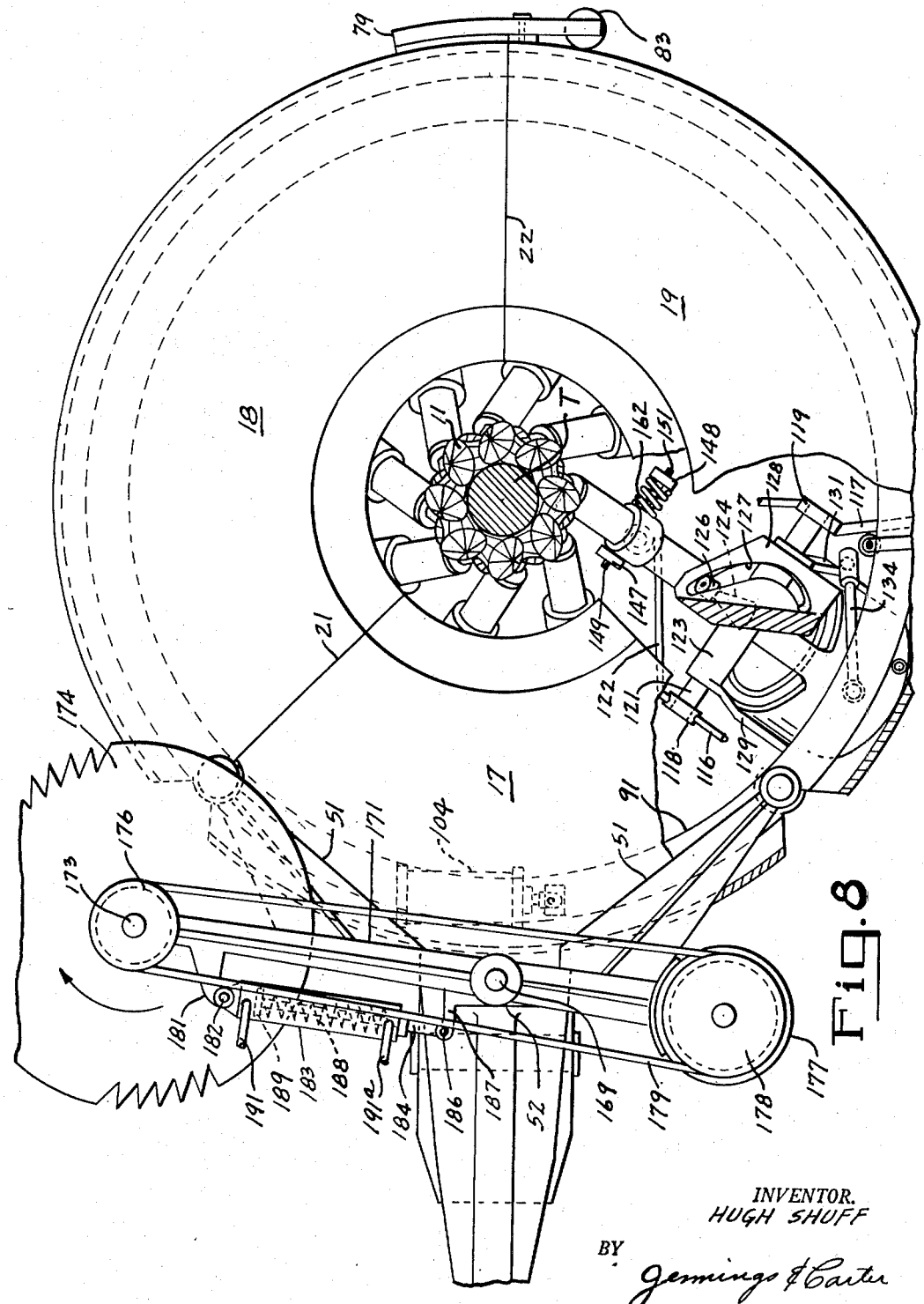
Fig. 8 is a somewhat diagrammatic sectional plan view illustrating the apparatus in position on a tree, certain of the parts being omitted for the sake of clarity.

As best illustrated in Figs. 8, 9 and 15 the several sections carry sets of inwardly projecting cutter assembly supporting frames. Each of these frames comprises inwardly projecting side arms or brackets 116 and 117. The arms are provided with parallel bosses 118 and 119 for receiving the ends of a cross rod or shaft 121. Inwardly of the bosses are arms 122 which are joined in any suitable manner to the thicker arcuate sections 17d, 18a, and 19a carried by the respective housing sections. Slidably and pivotally mounted on the pins 121 are sleeves 123 carrying an upwardly directed arm 124 adjacent their longitudinal centers.

Fitting rotatably on the upper end of the arm 124 is a roller 126. The roller 126 fits in an arcuate slot 127 formed in a bracket 128 carried under the cover portion 17b of the housing section 17. As best shown in Fig. 9 the bracket 128 is struck on a radius from the center line of the pin 121, while the slot 127 therein is curved on a curvature emperically determined as will later appear. Suffice it to say here that the object of the roller and slot arrangement is to cause the cutter portion of the cutter assembly to move toward the axial center line of the tree as the apparatus moves thereup.

The sleeve 123 carries depending arms 129 and 131. The arm 131 has a ball connection 132 on one side thereof for receiving the socketed end 133 of a rod 134. The other end of the rod 134 carries a socket end 136 making a universal connection with a ball 137 carried on a pin 138 secured to the ring section 91.

The inner upstanding arcuate sections 17a, 18a, and 19a are provided with vertical openings 139 to pivotally receive a pin 141. See Fig. 11. The lower end of the pin is threaded as at 142 and a nut 143 holds the head 144 of the pin in contact with the base of a U-shaped bracket having legs 147 and 148. The bracket thus is supported for pivotal movement, the nut 143 not being drawn so tight on the threaded end as to rigidly clamp the bracket for turning movement relative to the top of the sections 17a, 18a and 19a.

Mounted on opposed trunnions 149 and 151 between the legs of the U-shaped bracket is the forward end of a cutter assembly housing 152. The trunnions 149 and 151 are carried by a sleeve 153 within which the forward end of the housing 152 is rotatably received. The outer end of the housing 152 is supported on a bracket 154 mounted on the shell or frame of an electric motor 156. The motor in turn is mounted on trunnions 157 and 158 for pivotal movement relative to a mounting ring 159. The mounting ring 159 is in turn mounted between the arms 129 and 131 on trunnions 160 and 161.

The trunnions 149 and 151 carried by the sleeve 153 are free to slide axially between the legs 147 and 148 of the U-shaped bracket. Interposed between the sleeve 153 and the leg 148, which is on that side of the housing 152 farthest from the center line of the tree, is a compression spring 162. The spring 162 biases the assembly laterally toward the axial center line of the apparatus and hence serves the purpose of holding the cutters resiliently in engagement with the tree.

The cutter assembly supported from the housing 152 comprises a shaft 163 mounted for rotation at its outer end in a bearing 164 supported inside of the housing 152. The forward end of the shaft 163 is splined to the hollow end of a shaft 166, and the end of the shaft 166 is supported on a bearing 167 also mounted within the housing 152. The outer end of the shaft 166 is in turn supported on another bearing 168 within the housing. The cutters 10, as stated, may be in the form of elongated concave members having cutting teeth 11 in the form of longitudinally extending flutes. The cutters may be held to the outer end of the shaft 166 by means of bolts 169a.

From what has been so far described relative to the cutter assembly, it will be seen that when pressure is admitted to the cylinder 104 the control ring sections 91, 102, and 103, shift with respect to the housing sections when the housing is closed. Through the medium of the rods 134 each of the sets of arms 129 and 131 are raised upwardly or downwardly in response to movement of the ring sections and, due to the coaction of the roller 126 and the slot 127 together with the sliding motion permitted by the pin 151 in the legs 147 and 148, the entire cutter assembly moves laterally toward and from the tree. The curvature of the slot 127 is such that as the angularity of the axial center of the associated cutter assembly changes relative to the horizontal, the cutter is moved toward and from the tree with a greater or less amount of movement. Thus, the cutter moves toward the tree a greater distance per unit of upward movement of the motor end of the assembly when the angle between the cutters and the horizontal is at a minimum, and vice-versa. When the cutters are acting on the base of the tree and the entire apparatus is moved along the trunk thereof upwardly, it is possible, through the control mechanism later to be described, to maintain the cutters both at the correct angular relation and at the correct lateral distance from the tree to compensate for change in diameter of the tree at different places along the length of the trunk thereof. The springs 162 are effective to hold the cutters resiliently to their work, it being noted that the forward end of the cutter assembly housing can move laterally away from the tree due to the provision of the pivot points 157 and 158 without moving the control rings.

The apparatus for topping the tree after the same has been barked will now be described. Mounted in the vertical portion 52 of the housing section 17 is a vertically disposed pin 169. Pivotally mounted on the pin 169 is an arm 171 carrying at one end a vertically disposed bearing boss 172 for receiving a shaft 173. On the lower end of the shaft is mounted a circular saw 174, and on the upper end of the shaft 173 is mounted a pulley 176.

At the opposite end of the arm 171, and at a distance to substantially balance the arm about the pivot point 169 is an electric motor 177 carrying a drive pulley 178. A belt 179 is trained over the pulleys 176 and 178.

Adjacent the saw end of the arm is an outstanding bracket 181. Pivotally connected as at 182 to the bracket 181 is the end of a fluid pressure cylinder 183. The cylinder carries a piston rod 184 which is pivotally connected at 186 to the bracket 187 carried by the part 52 of the housing section 17. Within the cylinder 183 is a compression spring 188 which abuts at one end against the cylinder and at its other end against the piston 189 carried by the piston rod 184. The effect of the spring 188 thus is to bias the arm 171 counterclockwise as viewed in Fig. 8, assuring that the saw remains out of control with the cutting elements or the tree until the desired time. Fluid under pressure may be admitted to the ends of the cylinder 183 adjacent the saw through lines 191 and 191a.

Referring now particularly to Figs. 5, 7, 10, 14 and 14a, I will now describe the mechanism for clamping the apparatus on the tree after the same has been barked and topped so that the tree may be supported while being cut by workmen adjacent its base and then loaded on a suitable vehicle for transportation to the saw mill. Generally, the clamping mechanism comprises means carried on the housing and operable at the will of the operator to move inwardly, clamping the tree trunk. This mechanism comprises a pair of clamping members 192 and 193 which may be in the form of V-shaped members with open or separate fingers 194. The clamps 192 and 193 may each embody a boss 196 having an opening 197 therein. Passing through the boss openings 197 are pins 198 anchored in spaced and vertically extending flanges 199 and 201 which are located on the confronting sides of arms 202 and 203. The arms 202 and 203 carry upper and lower sleeves 204 and 206, 207 and 208, respectively. The sleeves 204 and 207 are slidably mounted for movement toward each other on a rod 209, while the sleeves 206 and 208 are similarly mounted on a rod 211. The rods are supported at each end in bosses 212 and 213 carried by a plate 214 forming a part of the central portion 52 of the housing section 17.

It will be seen that the arms 202 and 203 are formed integrally with the sleeve pairs 204, 206, and 207, 208, respectively, and that the arms outstand from the sleeves. Mounted to the arm 202 and its sleeves 204 and 206 is a rack bar 216 which projects toward the other clamping unit. Similarly mounted to the unit comprising the sleeves 207 and 208 and the arm 203 is another rack bar 217.

Projecting from a vertical rib 218 carried as a part of the housing section 17 is a pin 219 which extends between the rack bar 216 and 217. Rotatably mounted on the pin 219 is a pinion 221 which meshes with the rack bars 216 and 217.

Secured to outstanding plates 222 and 223 carried integrally with the plate 214 are double acting fluid pressure cylinders 224 and 226. The cylinder 224 carries a piston 227 and a piston rod 228. The cylinder 226 carries a piston 229 and a piston rod 231. The piston rod 231 is connected by means of a nut 232 to an ear 233 outstanding from the sleeve 204. In a similar manner, the piston rod 228 is connected to an ear 233a and held by a nut 232a carried by the sleeve 208. Fluid under pressure may be admitted to the cylinders 224 and 226 through fluid pressure lines 234—236 and 237—238, respectively (see Fig. 18).

The clamping members 192 and 193 are pivotally mounted for rocking motion about their respective pins 198. This permits the gripping members to accommodate themselves to the trunk of a tree when they are brought together in response to pressure from the cylinders. Also, the rack and pinion arrangement assures that these units move equally so that they grip the tree at the center of the entire apparatus.

Referring now to Fig. 18 of the drawings, which shows in wholly diagrammatic manner the controls for my improved apparatus, the operation of these controls will now be explained. As will be understood, the controls are located within reach of the operator of the crane C.

Assuming that the housing section 17, 18 and 19 are closed, and that the apparatus is mounted on the boom of the crane, the first step is to open the housing to permit the same to be placed about a tree. Fluid under pressure is drawn from a reservoir 239 by means of a pump 241 and passes through a pressure line 242 having therein a check valve 243. In the manner well understood, rearwardly of the check valve 243 is an accumulator 244.

The housing opening cylinder 66 is supplied with fluid under pressure from the pressure line 246 through a valve 247. The valve 247 may conveniently be a four-way valve without neutral position. Fluid under pressure from the line 246 is applied to the center of the valve 247 through a line 248, while fluid returning to the valve is returned to the reservoir 239 through a line 249. One end of the valve 247 is connected by a line 251 to the lower end of the valve casing of a normally closed stem operated limit valve 252. The line 69 connected to the cylinder 66 connects also to the opposite connection of the valve 252.

The valve 252 is mounted on a stationary part of one of the housing sections, preferably the section 17. The ring section 91 is provided with an outstanding lug 253 which is disposed to engage the stem 254 of the valve 252 and open the same when the pivot points for the housing sections are vertically aligned with those of the ring sections. Thus, when the pivot points of the ring sections and the housings are aligned, whereby the housing sections may be opened, fluid is free to flow to the cylinder 66 through the line 69. Fluid returning from the cylinder 66 flows through the line 71 to the valve portion of an on-off spring closing pilot valve 256 before returning to the valve 247 through a line 257. As will later appear, the function of the control valve 256 is to make it impossible to open the housing sections unless and until pressure is applied to the clamping members 192 and 193.

The cylinders 224 and 226 for the clamping members 192 and 193 are under control of a four-way valve 258, similar to the valve 247. Interposed in the line 259 leading from the valve 258 is a pressure regulating valve 261. The valve 261 connects by a line 262 to the actuating portion 256a of the valve 256, and the line 262 is continued to connect with lines 236 and 237. The purpose of the regulating valve 261 is to afford means for holding the members 192 and 193 lightly against the tree so that they act as guides as the apparatus is moved up the trunk of a tree, and then, by moving the valve 261 to a different position, causing these clamps to grip the tree for lifting purposes.

The movement of the arm 171 carrying the saw 174 is under control of a valve 263, similar to the valves 247 and 258 except that the valve 263 does not have a neutral position. Pressure from the line 246 is admitted selectively to the lines 264 and to the line 191a. Interposed in the line 264 is a pressure and speed regulating valve 266. The line 264 connects to a limit valve 267, similar to the valve 252, which is mounted on a stationary part of the housing section 17. The ring 91 carries a bracket 268 disposed to engage and open the valve 267 by contacting the stem 269, thereof.

When the valve 267 is open fluid under pressure flows through a line 271 to the valve portion of an on-off spring closing pilot valve 272. The line 191 leading to the cylinder 183 connects to the opposite connection of the valve 272. Likewise, the actuating portion 273 of the valve 272 is connected by a short line 274 to the line 262.

The control for the ring actuating cylinder 104 is in the form of the valve 276, similar to the valves 258, 247. Fluid under pressure is supplied to the valve 276 from the line 246, and thence to one end of the cylinder 104 through the line 114. Pressure is supplied through the line 277 having therein a limit valve 278, thence to the line 113. The valve 278 has a stem 279 which may be engaged by a part of the housing closing mechanism, whereby fluid under pressure can neither go to nor return from the cylinder 104 unless and until the housing sections are closed.

In order to prevent closing of the clamping members 192 and 193 except when the housing opening and closing valve 247 is moved to a position to put fluid under pressure in line 251, I provide an on-off spring closing pilot valve 281. The line 282 to which is connected the lines 234 and 238 from the cylinders 224 and 226 is controlled by the valve portion 280 of the valve 281.

The latch control cylinder 83 may be energized by connecting the fluid line 87 thereof to the line 69 leading to the cylinder 66. Thus, whenever the housing sections commence to open the latch cylinder 83 is placed under pressure, whereby the piston rod 86 thereof moves upwardly to disengage the latch.

The cylinder 39, which as will be remembered is the cylinder used to maintain the axial center line of the apparatus aligned with the axial center line of the tree, is under control of a valve 284, being a four-way valve with a closed neutral. Fluid under pressure is admitted to the valve by means of a line 286 from the line 246, and may return to the reservoir 239 through a line 287. The lines 43 and 44 are connected to the valve 284 in the manner shown.

At 288 I indicate a source of electro-motive force, for instance a generator. Each of the motors 156 may be supplied with energy from the generator 288 through the wires 289 and 291. A switch 292 may be interposed in the wire 291, whereby closing of the same, simultaneously energizes all of the motors 156.

In similar manner to that just described for the motors 156, the motor 177 may be supplied with energy from the generator 288 through the electrical circuits 293 and 294. The wire 294 may be under control of an electric switch 296.

From the foregoing the method of constructing and using my improved apparatus may now be explained and understood. In carrying out my improved method it is here to be clearly stated that apparatus other than that shown herein may be employed for the purpose. It is believed that as the operation of the method and apparatus is explained this will become apparent.

If it be assumed that the housing sections are closed and latched together, the first step in using the apparatus is to unlatch the housing sections, open them, and place the device about the tree. This is accomplished by moving the valve 247 to a position to admit fluid to the line 71. Due to the valve 252 this cannot be accomplished unless the pivot points for the housing and the ring sections are in vertical alignment, as will be seen by reference to Fig. 18. Likewise, fluid is admitted to the proper ends of the cylinders 224 and 226 through the valve 258 to separate the clamp members 192 and 193. The axis of the apparatus is properly adjusted by suitably manipulating the valve 284. The housing sections are now closed, and automatically locked in the manner previously explained whereupon the valve 261 is suitably adjusted so that the clamping members 192 and 193 ride lightly against the side of the tree, in order to guide the apparatus in its upward movement. The switch 292 is closed, energizing the cutter driving motors 156 and the ring control valve 276 is manipulated to energize cylinders 104, thus moving all of the cutters simultaneously and equally into engagement with the periphery of the tree. In view of the provision of the springs 162, each of the cutters is held resiliently to its work. The boom of the crane is now raised upwardly, moving the entire apparatus upwardly along the trunk of the tree and the bark is removed by the cutters. Upon engaging with a limb projecting from the tree, the cutting, conical ends 12 engage the limb and remove it. It will be noted that as the apparatus moves up the tree the angularity of the cutters 10 must increase relative to the horizontal as clearly illustrated in Figs. 1, 2, and 3. This is accomplished by suitable manipulation of the valve 276, moving the ring sections around, thus lowering the motor end of each of the assemblies. Simultaneously with the lowering of the cutter ends the pins 126 move in the suitably formed slots 127 whereby the cutters are urged more closely toward a common center, namely the axial center of the tree, thus to compensate for the decrease in diameter of the tree as the apparatus moves upwardly.

After the apparatus has progressed up the tree as far as is desired, the switch 296 is closed, energizing motor 177 and driving the saw 174. The saw is now swung over the center of the apparatus by suitable manipulation of valve 263, topping the tree. The saw is now withdrawn from the tree, and the apparatus is lowered down to a point where the clamping members 192 and 193 reach a position just above the center of gravity of the tree trunk. Having reached this position the cylinders 224 and 226 are energized to tightly clamp the members 192 and 193, and the slack is taken out of the crane boom, thus supporting the tree. Workmen now cut the tree along the line 14 near the base thereof whereupon the tree may be swung over onto a suitable vehicle, not shown, for transportation to the saw mill without permitting it to strike the ground. Due to the pivotal connection of the apparatus to the crane boom afforded by the boss 34 and bearings 29 and 31, the butt end of the tree may be placed on the vehicle bed and the tree lowered onto the vehicle. Holding the tree with its lower end resting on the vehicle bed, the gripping elements are released and the crane boom suitably moved to slide the apparatus off the end of the tree. Alternately, having placed the tree over the vehicle with its lower end resting thereon, the housing sections may be separated and then the clamp members suddenly withdrawn, permitting the tree to partially fall onto the vehicle.

It will be seen from the foregoing that I have devised an improved apparatus for barking and limbing trees, and for topping the same as well as for loading them onto vehicles. Further, it will be appreciated that my improved method may be carried out by various forms of apparatus, and hence I do not wish to be limited to the carrying out of the method by any particular apparatus. My invention is particularly adaptive for use in connection with the harvesting of pine trees for timber purposes and it will be apparent that slabs from the cutting of the trees into lumber are readily usable for various purposes, such for instance as in making paper.

While I have shown my invention in but one form, it will be obvious to those skilled in the art that it is not so limited, but is susceptible of various changes and modifications without departing from the spirit thereof, and I desire therefore that only such limitations shall be placed thereupon as are specifically set forth in the appended claims.

What I claim is:

1. In apparatus for barking standing trees, an arcuate supporting frame section, a pair of other arcuate frame sections pivoted to the ends of the supporting frame section for movement laterally thereof and cooperable therewith and with each other to define a frame structure completely surrounding the trunk of the tree to be barked, means carried by the several frame sections and operatively connected thereto for moving the pivoted sections relative to each other for opening the frame for placing about the trunk of a tree, a plurality of rotary driven cutting elements relatively arranged to define between them a cutting circle substantially co-extensive in periphery with the periphery of the tree trunk, means to move the apparatus along the tree, and means operable to contract and enlarge the cutting circle formed by said cutters thereby to accommodate them to the body of the tree throughout its usable length.

2. In apparatus of the character described, an annular housing embodying a supporting segment, other segments pivoted to the supporting segment for movement laterally thereof thereby to open the housing for placing about the trunk of a tree, a plurality of cutter assemblies mounted on the housing sections for rocking movement relative thereto and relative to the longitudinal axis of the tree trunk, axially rotatable cutters on the cutter assemblies, a driving motor for each cutter, cutter assembly tilting mechanism including a member slidably mounted relative to the housing, and a connection between the member and said cutter assemblies operable upon the sliding movement of said member to change the angle of elevation of the longitudinal axes of the cutters, means connecting the housing to the cutter assemblies for moving the cutters toward the tree, upon increasing the angle of elevation of said longitudinal axes and for moving the cutters away from the tree, upon decreasing said angle, and power operated means for moving the cutter assembly tilting mechanism.

3. In apparatus for barking standing trees, a housing disposed to encircle the trunk of the tree, a plurality of bark removing cutters, means in the housing mounting the cutters for rotation, said mounting means being relatively arranged so as to encircle the tree trunk, electric motors for driving each cutter; means operatively connected to each cutter for moving it toward and from the longitudinal center line of the tree trunk, said last named means comprising a ring-like control member supported from the housing and shiftable relative to the housing, a connection operatively interposed between each cutter and said ring-like member, brackets carried by the housing and having curved slots therein, other members operatively connected to the cutters and slidably fitting in the slot; and means to move the control member whereby the cutters simultaneously move in the same direction relative to the center line of the tree trunk through the co-action of the slotted brackets and the members slidable therein.

4. In apparatus for barking standing trees, a housing generally annular in shape and comprising sections hinged together for relative lateral movement, a plurality of cutter assemblies in the housing each of which comprises a cutter shaft support extending generally radially inwardly of the housing sections, means pivotally supporting the cutter shaft support adjacent its inner end for movement about an axis parallel to the longitudinal axis of the annular housing, a cutter shaft in said support extending inwardly of the housing past the pivotal support, a tree engaging cutter on the inner end of the shaft, a driving motor for the shaft carried on the outer end of the shaft support, means supporting the shaft support adjacent its outer end for sliding and swinging movement, said second named means having a portion slidable along a chord of the annular housing, said chord lying in a plane normal to the longitudinal axis of the housing, means acting on said second named means to raise and lower the outer end of the cutter shaft support, and means co-acting between the housing and said second named means for sliding the motor end of the shaft support in one direction, while the same is being raised, and in the opposite direction, while the same is being lowered.

5. Apparatus as defined in claim 4 in which the means to raise and lower the outer ends of the cutter shaft support comprises a ring to which each of the cutter shaft supports is operatively connected, means mounting said rings for movement concentrically within the annular housing, connections between the ring and the outer ends of the shaft supports, and power operated means for moving said ring.

6. Apparatus as defined in claim 4 in which the inner ends of the cutter shaft supports are slidably mounted, at the point where the same are pivotally supported, for movement along a chord parallel to said first named chord.

7. Apparatus as defined in claim 6 in which the inner ends of the cutter shaft supports are spring biased in a direction along said second named chord and toward the longitudinal axis of the housing.

HUGH SHUFF.

REFERENCES CITED

The following references are of record in the file of this patent:

UNITED STATES PATENTS

| Number | Name | Date |
| --- | --- | --- |
| 944,290 | Spaak | Dec. 28, 1909 |
| 2,477,922 | Emery et al. | Aug. 2, 1949 |
| 2,482,392 | Whitaker | Sept. 20, 1949 |
| 2,504,856 | Luplow | Apr. 18, 1950 |
| 2,541,767 | Jones | Feb. 13, 1951 |

FOREIGN PATENTS

| Number | Country | Date |
| --- | --- | --- |
| 233,629 | Switzerland | Nov. 1, 1944 |